Jan. 31, 1928.
C. ROBERTS
1,657,686
TREAD MEMBER FOR BOOTS AND SHOES
Filed March 20, 1924
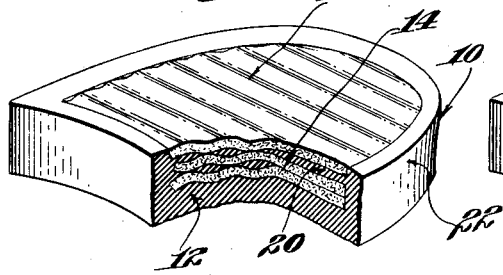
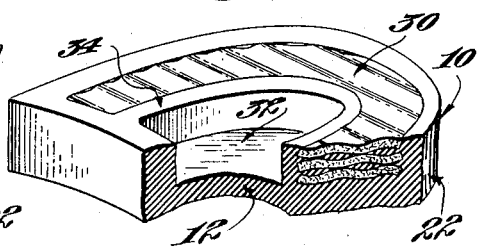
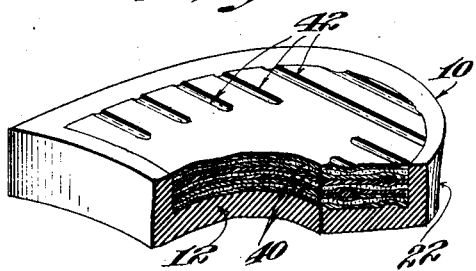
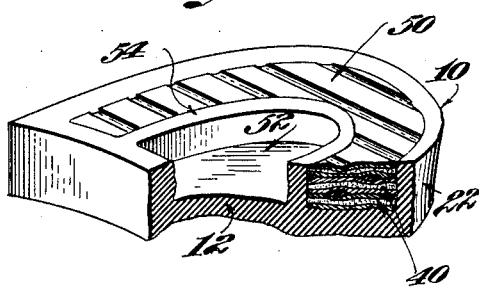
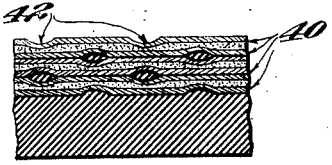

Patented Jan. 31, 1928.

1,657,686

UNITED STATES PATENT OFFICE.

CLIFFORD ROBERTS, OF REIGATE, ENGLAND.

TREAD MEMBER FOR BOOTS AND SHOES.

Application filed March 20, 1924. Serial No. 700,555.

The present invention relates to tread members for boots and shoes and more particularly to tread members of resilient material such as rubber heels.

The object of the present invention is to provide an improved form of nail holding insert embedded within either a whole or a half heel or other tread member and designed to be firmly bonded or united with the rubber covering in such a manner as to effectually prevent disengagement of the insert from the tread member.

With this object in view, one feature of the invention contemplates the provision of a plurality of layers or sheets of nail holding material, the individual sheets having lateral depressions or recesses formed therein to provide openings or passages extending inwardly from the edge of the insert when the sheets or layers are assembled. The provision of these passages extending laterally between the sheets or layers affords channels for the flow of rubber compound between the layers of the insert during the vulcanizing operation and not only promotes the effective bonding of the insert to the rubber cover but permits the use of materials which could not otherwise be effectively bonded to the rubber compound. It will be evident to those skilled in the art that with this form of insert a plurality of fins or tongues of rubber compound are formed within the insert and are connected integrally with the side faces of the heel or tread member. It is impossible to disengage the insert from the tread member as a whole without severing these lateral tongues. As the several layers of the insert are firmly united to one another, a mechanical bond or interlock of great strength is secured. Such a bond is particularly desirable in those cases where in insert is relied upon to hold the attaching nails and retain the tread member in close contact with the boot or shoe. In such cases, the strain tending to dislodge the tread member directly tends to disengage or loosen the insert with respect to the surrounding body of rubber compound.

Still further features of the invention consist in certain novel features of construction, combinations and arrangements of parts hereinafter described and claimed, the advantages of which will be obvious to those skilled in the art from the following description.

In the accompanying drawings illustrating the preferred form of the invention, Fig. 1 represents a perspective partly in section of a rubber heel member having an insert embedded therein consisting of a series of corrugated sheets of leather-board or similar material; Fig. 2 is a perspective partly in section of a heel similar to the heel of Fig. 1 with a centrally formed recess surrounded by a corrugated insert of leather-board; Fig. 3 represents a perspective view partly in section of a heel member provided with an embedded insert consisting of a plurality of sheets of ply-wood having their opposing surfaces scored or recessed to provide lateral channels; Fig. 4 is a perspective of a heel similar to Fig. 3 but provided with a centrally disposed recess surrounded by a ply-wood insert; Fig. 5 is a detail illustrating a section of the corrugated sheets of leather-board and the manner in which the rubber compound flows between the sheets; and Fig. 6 is a detail illustrating a section of the ply-wood sheets showing the character of the corrugations.

The heel shown in the illustrated embodiment of the invention comprises essentially a nailing medium in the form of an insert embedded within the upper portion of a rubber heel and completely surrounded at the bottom or tread face and sides by a molded rubber compound. The nailing medium preferably consists of a plurality of relatively thin layers of wood having the desired shape or contour and secured together to form a substantially unitary body. These layers may consist of individual sheets of wood or may consist of a plurality of layers of ply-wood, each layer of ply-wood consisting of a plurality of sheets having the grain crossed. The wooden body or insert is provided with a series of lateral channels or passages between the upper and lower faces to permit the flow of rubber compound between the layers. As indicated in Figs. 3, 4 and 6, these channels may conveniently be formed through the provision of depressions or recesses formed in the faces of the ply-wood lifts by compressing restricted portions of the lifts. With such an arrangement, when the several recessed lifts or layers are secured together to form a body, a series of lateral channels extend between the faces, the major portion of the surfaces of the lifts contacting with one another. This method of providing the lateral channels extending between the faces of the insert secures the desired result without weakening the body or rendering it liable to distortion through the pressure employed in the vulcanizing operation. An alternative method of providing the lateral channels between the faces of the insert is illustrated in Figs. 1, 2 and 5, this method consisting in corrugating the individual layers of the insert and thereafter assembling the layers in such a manner that channels or passages are formed between the layers extending inwardly from the edges. Although such a method may be practical, it renders the insert more liable to distortion under the vulcanizing pressure than the method illustrated in Figs. 3 and 4.

Referring to the illustrated embodiment of the invention, Fig. 1 indicates a heel member 10 consisting of a molded rubber body 12 with a nailing insert 14 embedded in the upper portion. This nailing insert, as indicated more particularly in Fig. 5, may comprise a plurality of sheets or layers 16 of leather-board or similar material having the general outline of a heel and provided with a series of corrugations indicated at 18. The plurality of layers are assembled and secured in any desired manner, as by adhesive or fasteners, and are thereafter inserted in a heel mold in a manner which will be obvious to those skilled in the art. During the vulcanizing operation, the rubber compound is caused to flow inwardly into the channels formed by the corrugations to form rubber tongues or fins indicated at 20, these tongues or fins projecting integrally from the sides 22 of the rubber body and serving to interlock the insert firmly with the rubber carcass. Although this form or leather-board and similar material, it is to be understood that sheets of wood or plywood may be corrugated in a similar manner if so desired. In attaching the heel, the nails may be driven through the heel from the tread face until the heads contact with the lower face of the insert, the latter being of sufficient strength and toughness to prevent withdrawal of the nail heads therethrough and serving to retain the heel firmly in place on the boot or shoe. It should be understood, furthermore, that the material employed as an insert is of a character more or less readily penetrable by the attaching nails.

The insert illustrated in Fig. 1 has the general contour of a heel and occupies the entire central portion of the rubber heel. Fig. 2 illustrates a slightly modified form of insert, which, as indicated at 30, has a generally U-shaped arrangement embracing a central depression 32, the inner edge of the insert being surrounded by a wall of rubber compound 34. In this construction, the several layers of the insert are recessed through corrugations to provide channels extending across the insert when the lifts are assembled, into which tongues or fins of rubber compound penetrate, as indicated clearly in the drawings. It will be evident to those skilled in the art that with this form of construction the U-shaped insert is bonded to the rubber compound in such a manner that it cannot be disengaged therefrom.

The preferred form of insert is illustrated in Figs. 3, 4 and 6. In this construction, a series of ply-wood lifts indicated respectively at 40 are grooved or recessed at 42 upon their opposite faces.

These grooves are formed by compressing restricted portions of the lift, leaving the remaining and major portions of the lift surfaces substantially flat. When a series of grooved ply-wood lifts are assembled in the manner indicated in Fig. 6 and secured together by adhesive or fastenings, a composite body is provided having a plurality of lateral channels extending inwardly from the edges. These channels do not interfere substantially with the strength and resistance to distortion of the body, which is able to withstand the vulcanizing pressure. As indicated in Fig. 3, the grooves 42 may extend inwardly from the edges of the body throughout a portion of the area of the lift, the length of the grooves being sufficient to secure the desired bond or interlock between the insert and the rubber body. Fig. 4 indicates the employment of grooved ply-wood lifts having a general U-shape, as shown at 50. This U-shaped insert surrounds a central depression 52 formed in the heel, the inner edges of the lift being sealed by a wall 54 of rubber compound.

From the foregoing description, it will be evident to those skilled in the art that one of the essential features of the present invention resides in the formation of openings, recesses, channels, or the like, extending inwardly from the edge of the completed insert to a greater or less depth, these openings or recesses cooperating with the rubber compound in the vulcanizing operation to form locking tongues or fins or projections extending integrally from the sides of the rubber covering between the upper and lower faces of the insert, the projections or the like serving to interlock the insert with the rubber cover in a manner to prevent movement of the insert in a direction to withdraw the latter from the covering.

I claim:

1. A resilient tread member for boots or shoes comprising a nail holding insert consisting of a plurality of layers of material, a plurality of recesses extending inwardly from the edges of the insert between the upper and lower faces, and a body of rubber compound surrounding the bottom and sides of the insert and having integral projections entering the recesses from the sides of the body to interlock the body of rubber compound during the vulcanizing operation with the insert.

2. A resilient tread member for boots and shoes comprising a plurality of assembled layers of nail holding material, the layers being provided with depressions to form lateral channels when the layers are assembled, and a body of rubber compound surrounding the bottom and sides of the assembled layers and having integral tongues extending into the channels to interlock the body with the embedded layers of nail holding material.

3. A resilient tread member for boots and shoes comprising a plurality of layers of fibrous material, each having restricted portions of its area compressed to form surface grooves extending inwardly from the edge, means for retaining the layers in assembled relation, and a covering of rubber compound surrounding the bottom and sides of the layers and extending inwardly into the grooves.

4. A resilient heel for boots and shoes comprising a nail holding insert consisting of a plurality of ply-wood lifts, each lift having a series of grooves extending inwardly from the edge formed by compressing a restricted portion of the lift, means for retaining the lifts in assembled relation, and a covering of rubber compound surrounding the bottom and sides of the assembled lifts.

5. A resilient heel for boots and shoes comprising a series of skeleton ply-wood lifts having the general outline of a heel, a plurality of lateral grooves formed in each of the lifts by compressing a restricted portion thereof, means for retaining the lifts in assembled relation, and a covering of rubber compound surrounding the bottom and sides of the lifts and extending into the lateral grooves.

In testimony whereof I have signed my name to this specification.

CLIFFORD ROBERTS.